May 26, 1925. 1,539,087
M. HORRELL
MIXING DEVICE
Filed Dec. 18, 1922
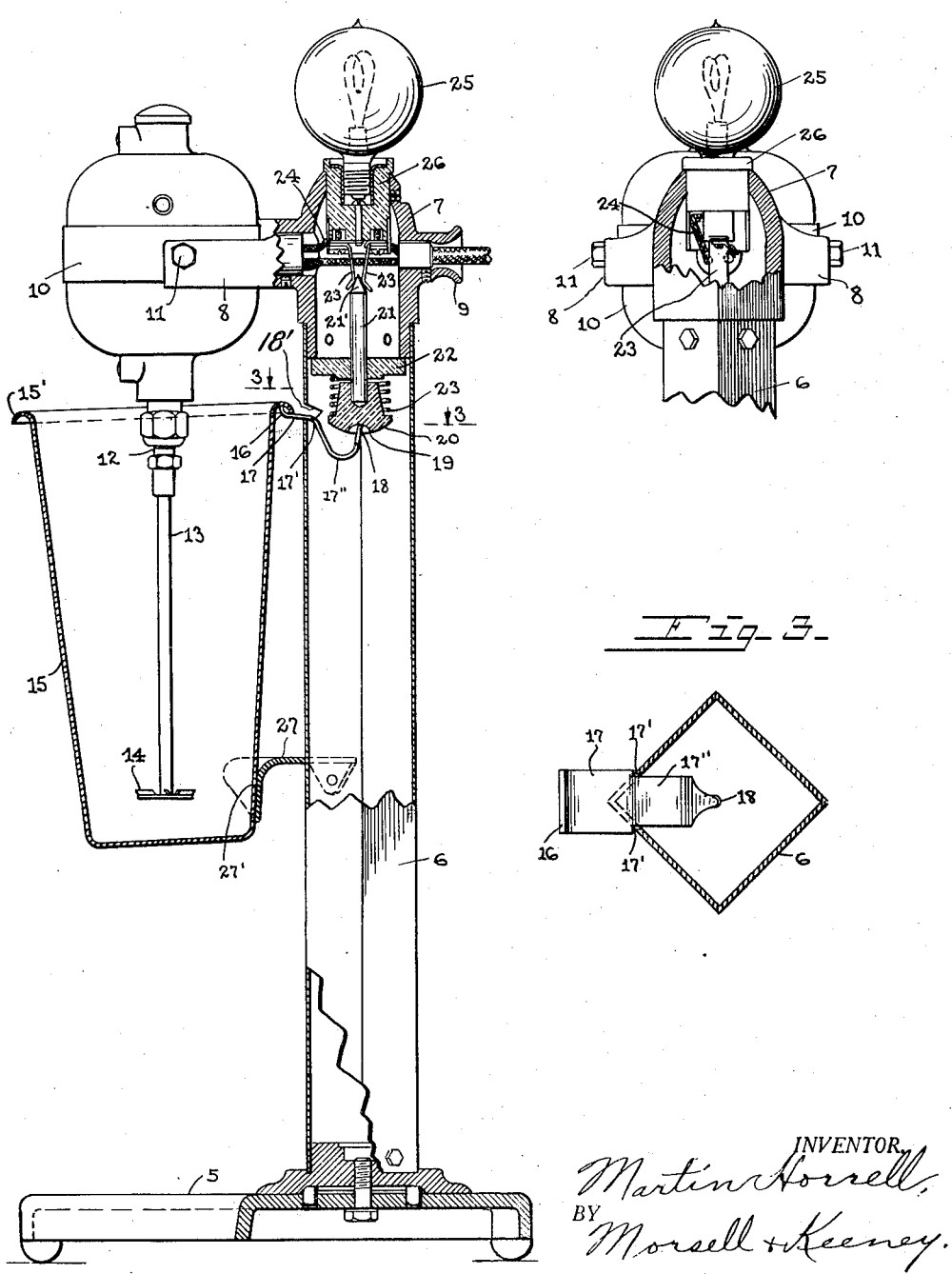
INVENTOR
Martin Horrell,
BY Morsell & Keeney.
ATTORNEYS.

Patented May 26, 1925.

1,539,087

UNITED STATES PATENT OFFICE.

MARTIN HORRELL, OF RACINE, WISCONSIN, ASSIGNOR TO HAMILTON BEACH MFG. CO., OF RACINE, WISCONSIN, A CORPORATION OF WISCONSIN.

MIXING DEVICE.

Application filed December 18, 1922. Serial No. 607,716.

*To all whom it may concern:*

Be it known that I, MARTIN HORRELL, a citizen of the United States, and resident of Racine, in the county of Racine and State of Wisconsin, have invented new and useful Improvements in Mixing Devices, of which the following is a description, reference being had to the accompanying drawings, which are a part of this specification.

This invention relates to improvements in mixing devices.

It is one of the objects of the present invention to provide a mixing device which is more particularly adapted for mixing liquid beverages and food substances with the liquids in a very efficient manner.

A further object of the invention is to provide a mixing device in which the placing of the mixing receptacle, in position to have the contents mixed by the device, will immediately switch on the electric current to the motor of the device and rotate the agitating member thereof, and when the receptacle is removed the switch will automatically turn off the current.

A further object of the invention is to provide a mixing device in which the mixing container is suspended and entirely supported from a lever which controls the electric circuit to the electric motor of the device.

A further object of the invention is to provide a mixing device in which the weight of the mixing receptacle and its contents will automatically hold the controlling switch in its on position while the contents are being mixed.

A further object of the invention is to provide a mixing device which is of simple construction, is strong and durable and is well adapted for the purpose described.

With the above and other objects in view, the invention consists of the improved mixing device and its parts and combinations as set forth in the claims, and all equivalents thereof.

In the accompanying drawing in which the same reference characters indicate the same parts in all of the views:

Fig. 1 is a side view of the improved mixing device, parts broken away and other parts being shown in section to illustrate interior construction;

Fig. 2 is a detail view of the upper portion of the device partly shown in section and taken at right angles to Fig. 1; and Fig. 3 is a transverse sectional view on a larger scale taken on line 3—3 of Fig. 1.

Referring to the drawing, the numeral 5 indicates a base or support upon which is mounted a standard 6 formed of a rectangular piece of tubing having a cap portion 7 at its upper end. Said cap is formed with a forwardly extending tubular and bifurcated arm 8 and a rearwardly extending tubular portion 9.

An electric motor 10 extending between and secured to the bifurcated portions of the arm 8 by bolts 11 is provided with a vertically extending shaft 12 to the lower end of which a stirrer shaft 13 is connected. The lower end of the stirrer shaft carries a stirrer 14 which is positioned to extend into the lower portion of the mixer receptacle 15 in which the ingredients are mixed. The upper edge portion of the receptacle 15 is flanged or rolled outwardly and downwardly as indicated by the numeral 15' to form a hook like edge which is adapted to hook over the outer upturned end 16 of the angular receptacle supporting lever 17. Said lever 17 extends through an opening 18' in one wall of the standard and is fulcrumed upon the lower edge portion thereof forming the opening. The portion of the lever within the standard is of less width than the outer portion to form shoulders 17' which bear against the outer portion of the standard and in combination with the inner downwardly curved portion 17'' maintains the lever in position. The inner end portion of the lever extends upwardly and terminates in a rounded point 18 which enters the rounded recess 19 of the insulating switch member 20. An upstanding contact rod 21 is carried by the member 20 and is reciprocally guided by an insulating guide member 22 positioned within the standard and bearing against the lower end of the cap portion 7. A coiled spring 23 surrounds the switch member 20 and the rod 21 and is interposed between a portion of the switch member 20 and the guide member 22 and normally holds said member in its lowermost position. Said spring is of such strength as to be compressed by the weight of the mixing receptacle and its contents when supported on the upturned end 16 of the lever 17, and which weight will slide the insulating member 20 and its contact rod 21 to move upwardly to contacting position. The upper end 21' of the contact rod 21 is of conical form and is adapted to extend between the spaced downwardly projecting yielding contacts 23 and bridge the same when the contact rod is in its upper position. Said contacts are included in an electric circuit 24 which also includes an electric lamp 25 removably mounted in the upper end portion of the standard. The wires of said electric circuit 24 extend through the tubular portion 9 and the tubular portion of the bifurcated arm 8 to the electric motor 10. An insulating member 26 in the upper end portion of the standard 6 carries the lamp 25 and the fixed contacts 23 and insulates said parts from the standard 6.

To prevent lateral movement of the receptacle 15 while the contents thereof is being mixed, a bracket member 27 is mounted on the standard and at its forward end is of curved formation as indicated by the numeral 27' to engage and hold the side portion of the receptacle.

In use it is only necessary to hook the upper edge of the receptacle over the upturned end of the switch lever and the weight of the receptacle will automatically close the switch to the motor and the lamp, the lamp will be lighted and the motor actuated to rotate the stirrer and mix the contents of the receptacle. The light will burn during the mixing operation, and when the mixing is completed, it is only necessary to remove the receptacle and the lever will then automatically switch off the current to the motor and the lamp.

From the foregoing description, it will be seen that the mixing device is of very simple construction and is well adapted for the purpose described.

What I claim as my invention is:

1. A mixing device, comprising a support, a switch lever extending therefrom and having means for suspending a mixing receptacle thereon, an electric motor controlled by said switch and having a depending stirring member, and a mixing receptacle suspensible from said switch lever and entered by the stirring member, the weight of the mixing receptacle causing said switch lever to automatically turn on the electric current to the motor.

2. A mixing device, comprising a standard, an electric motor carried thereby and having a depending shaft provided with a stirring member at its lower end portion, a switch lever projecting from said standard for controlling the current to said motor and having means for suspending a mixing receptacle thereon, and a mixing receptacle suspensible from said switch lever and entered by the stirring device, the weight of the mixing receptacle causing said switch lever to automatically turn on the electric current to the motor.

3. A mixing device, comprising a standard, an electric motor carried thereby and having a depending shaft provided with a stirring member at its lower end portion, a switch carried by said standard for controlling the electric current to the motor and having means for suspending a mixing receptacle thereon, a switch lever engaging said switch and projecting from the standard, and a mixing receptacle suspensible from the outer portion of the switch lever and entered by the stirring member, the weight of the mixing receptacle causing said switch lever to automatically turn on the electric current to the motor.

4. A mixing device, comprising a support, a switch lever extending therefrom and having means for suspending a mixing receptacle thereon, an electric motor controlled by said switch and having a depending stirring member, and a mixing receptacle suspensible from said switch lever and entered by the stirring member, a bracket projecting from the support in position to be engaged by the side portion of the receptacle to prevent side movement thereof, the weight of the mixing receptacle causing said switch lever to automatically turn on the electric current to the motor.

5. A mixing device, comprising a standard, an electric motor carried thereby and having a depending shaft provided with a stirring member at its lower end portion, a switch carried by said standard for controlling the electric current to the motor and having means for suspending a mixing receptacle therefrom, a switch lever engaging said switch and projecting from the standard, and a mixing receptacle suspensible from the outer portion of the switch lever and entered by the stirring member, a fixed bracket projecting from the standard in position to be engaged by the side portion of the receptacle to prevent side movement thereof, the weight of the mixing receptacle causing said switch lever to automatically turn on the electric current to the motor.

6. A mixing device, comprising a standard, an electric motor carried thereby and having a depending shaft provided with a stirring member at its lower end portion, a pair of spaced fixed contact members carried by the standard and included in an electric circuit which includes the motor, a movable switch member for bridging said fixed contacts, a switch lever engaging said movable switch member and projecting outwardly from the standard and having means for suspending a mixing receptacle therefrom, a bracket projecting from a medial portion of the standard in a position to be engaged by the side portion of a mixing receptacle to prevent lateral movement thereof, and a mixing receptacle suspensible from the outer end portion of the switch lever and engaging the bracket and entered by the stirring member, the weight of the mixing receptacle moving the switch lever to cause the movable switch member to bridge the fixed contacts and automatically turn on the electric current to the motor.

7. A mixing device, comprising a standard, an electric motor carried by the upper portion of the standard and having a depending shaft provided with a stirring member at its lower end portion, a switch lever projecting from the upper portion of said lever and having an upturned end portion, and a mixing receptacle having an outwardly and downwardly flanged upper edge adapted to hook over the upturned end of the switch lever to suspend the receptacle therefrom in mixing position, the weight of the receptacle causing said switch lever to turn on the current to the motor.

8. A mixing device, comprising a standard, an electric motor carried by the upper portion of the standard and having a depending shaft provided with a stirring member at its lower end portion, a switch lever projecting from the upper portion of said lever and having an upturned end portion, a bracket projecting from the support in position to be engaged by the side portion of a mixing receptacle to prevent side movement thereof, and a mixing receptacle having an outwardly and downwardly flanged upper edge adapted to hook over the upturned end of the switch lever to suspend the receptacle therefrom in mixing position, the weight of the receptacle causing said switch lever to turn on the current to said motor.

9. A mixing device, comprising a standard having an outwardly extending arm, an electric motor carried by the arm and having a depending shaft provided with a stirring member at its lower end portion, a pair of spaced fixed contact members positioned within the standard and included within an electric circuit which also includes the motor, a reciprocal switch member for bridging said fixed contacts, means for yieldingly holding the switch member in its off position, a switch lever extending through and fulcrumed on the standard and in engagement with the reciprocal switch member, the outer end of the said switch lever extending upwardly, a bracket extending from a medial portion of the standard, and a mixing receptacle having an outwardly and downwardly flanged upper edge adapted to hook over the upturned end of the switch lever to suspend said receptacle therefrom in mixing position, the side portion of the receptacle engaging the bracket to prevent lateral movement and the weight of the receptacle causing said switch lever to actuate the reciprocal switch lever to bridge the fixed contacts and complete the circuit to the motor.

10. A mixing device, comprising a standard having an outwardly extending arm, an electric motor carried by the arm and having a depending shaft provided with a stirring member at its lower end portion, an electric lamp mounted in the upper portion of the standard, a pair of spaced fixed contact members positioned within the standard and included within an electric circuit which also includes the motor and the lamp, a reciprocal switch member for bridging said fixed contacts, means for yieldingly holding the switch member in its off position, a switch lever extending through and fulcrumed on the standard and in engagement with the reciprocal switch member, the outer end of the said switch lever extending upwardly, a bracket extending from a medial portion of the standard, and a mixing receptacle having an outwardly and downwardly flanged upper edge adapted to hook over the upturned end of the switch lever to suspend said receptacle therefrom in mixing position, the side portion of the receptacle engaging the bracket to prevent lateral movement and the weight of the receptacle causing said switch lever to actuate the reciprocal switch lever to bridge the fixed contacts and complete the circuit to the motor and the lamp.

In testimony whereof, I affix my signature.

MARTIN HORRELL.